United States Patent [19]

Dobberpuhl

[11] 4,136,983
[45] Jan. 30, 1979

[54] DRAG STAKE MOUNTING FOR WALK-BEHIND ROTARY TILLER

[75] Inventor: Dale R. Dobberpuhl, Horicon, Wis.

[73] Assignee: Deere & Company, Moline, Ill.

[21] Appl. No.: 881,407

[22] Filed: Feb. 21, 1978

[51] Int. Cl.² ............................................. F16B 7/14
[52] U.S. Cl. .................................... 403/108; 280/763; 172/43; 248/354 L; 403/347; 403/396
[58] Field of Search ............... 403/108, 321, 388, 396, 403/397, 347; 248/354 L, 295 C; 280/43, 475, 763; 172/43, 415

[56]  References Cited

U.S. PATENT DOCUMENTS

| 694,351 | 3/1902 | Chappel | 403/321 X |
| 1,749,458 | 3/1930 | Woodbridge | 403/321 X |
| 2,256,856 | 9/1941 | Zwald | 248/295 B X |
| 2,403,135 | 7/1946 | Stewart | 403/108 X |
| 3,876,321 | 4/1975 | Haines | 403/397 X |

FOREIGN PATENT DOCUMENTS

| 236589 | 7/1911 | Fed. Rep. of Germany | 403/321 |
| 285988 | 2/1928 | United Kingdom | 248/354 L |

Primary Examiner—Wayne L. Shedd

[57] ABSTRACT

A walk-behind rotary tiller includes a vertically adjustable drag stake releasably held in a selected position through means of a lock member having the form of a ring segment and mounted such that it may be pivoted upwardly and displaced forwardly to release the drag stake for vertical adjustment to another desired position and then displaced rearwardly and rotated downwardly to retain the drag stake in its new position.

4 Claims, 3 Drawing Figures

DRAG STAKE MOUNTING FOR WALK-BEHIND ROTARY TILLER

BACKGROUND OF THE INVENTION

The present invention relates to walk-behind rotary tillers and more specifically relates to a particular way of mounting the drag stake for vertical adjustment.

Walk-behind tillers utilize their tilling tines to propel them forwardly and are commonly provided with drag stakes which penetrate the ground during tilling operation such as to retard the forward progress of the tilling tines to ensure that the latter will dig to a predetermined depth before the tiller progresses forwardly. These drag stakes are often mounted for vertical adjustment in order to accommodate for different desired tilling depths and for differences in the soil being tilled. One common way for these drag stakes to be mounted is to provide a series of vertically spaced transverse holes therein which can be selectively moved into alignment with a transverse hole provided in the tiller frame with the stake being held in place by a pin or bolt releasably received in the aligned holes. Thus, in order to adjust the drag stake vertically, it is necessary to withdraw the pin or bolt from a first set of aligned holes and then to reinsert the pin or bolt in a second set of aligned holes once the stake is adjusted. This operation is not entirely satisfactory since it lacks simplicity and is time consuming.

SUMMARY OF THE INVENTION

According to the present invention, there is provided a novel assembly for mounting a tiller drag stake for vertical adjustment.

A broad object of the invention is to provide a tiller drag stake mounting assembly which permits the drag stake to be easily and quickly adjusted vertically.

A more specific object is to provide a tiller drag stake mounting which includes a locking member which, when the drag stake is being adjusted, need not be removed from a transverse hole provided in a member to which the drag stake is releasably fixed.

These and other objects will become apparent from a reading of the ensuing description together with the appended drawings.

The structure for accomplishing these objects includes a drag stake slidably received in a socket defined by a bracket and a lock member having a first transverse section received in a hole in the bracket and removably received in a selected one of a plurality of notches provided in a forward side of the drag stake. In order to permit the lock member to be moved out of engagement with the selected notch of the drag stake so as to permit the latter to be adjusted vertically, the hole in the bracket is elongated forwardly of the drag stake sufficently to permit the first transverse section of the lock member to be selectively shifted forwardly to free the drag stake. To prevent the lock member from accidentally shifting forwardly in the elongated hole, the lock member includes a second transverse section, connected to the first section by a fore-and-aft section, and located rearwardly of the bracket. The lock member is vertically swingable about its first transverse section between a lock position, wherein the second transverse section engages a resting surface of the rear of the bracket to prevent the first transverse section from moving out of a selected notch of the drag stake, and a release position wherein the second transverse section is disposed for moving forwardly into a recess provided in the rear of the bracket such that the first transverse section may move forwardly in the elongate hold and from the selected notch of the drag stake.

DESCRIPTION OF THE PREFERRED EMBODIMENT

Figure 1:
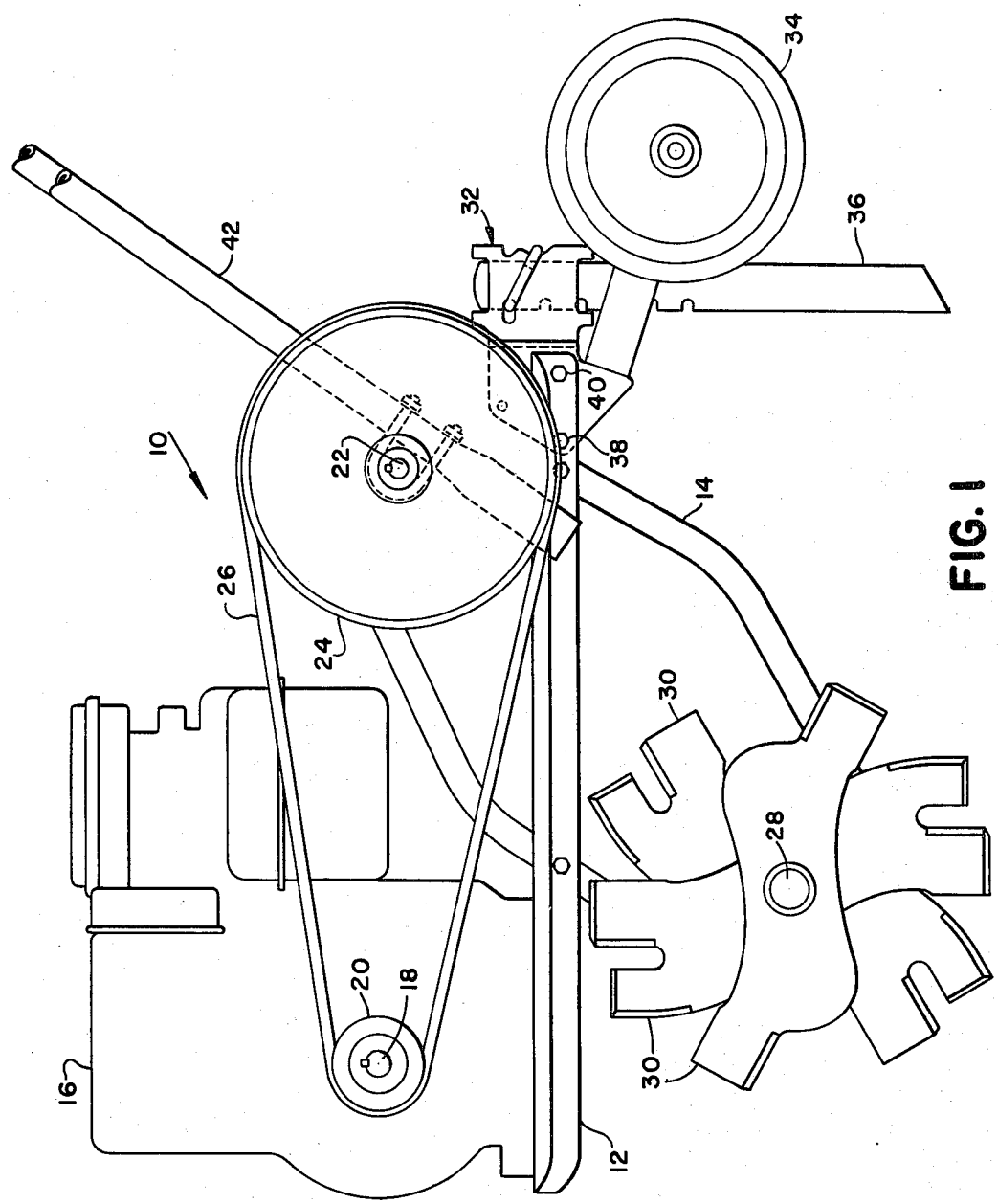
FIG. 1 is a left side elevational view of a rotary tiller embodying a drag stake mounted according to the principles of the present invention.

Referring now to FIG. 1, therein is shown a walk-behind rotary tiller 10 including a fore-and-aft extending main frame 12 to which is fixed a chain case 14 inclined between rear and front ends respectively located above and below rear and front portions of the frame 12. An internal combustion engine 16 is mounted on the front portion of the frame 12 and includes an output shaft 18 on which is mounted a pulley 20. A counter shaft 22 is rotatably journaled in the rear end of the chain case 14 and has a pulley 24 mounted thereon which is aligned with the pulley 20 and coupled thereto by a drive belt 26. A chain and sprocket drive train (not shown) couples the counter shaft 22 with a rotor shaft 28 rotatably mounted in the lower end of the chain case 14 and to which a plurality of tiller tines 30 are fixed. Secured to the rear end of the frame 12 is a bracket 32 to which is connected a pair of ground wheels 34 (only one shown) and a drag stake 36. The bracket 32 is secured to the frame 12 by means of front and rear fasteners 38 and 40, which may be pins or bolts or the like. Preferrably, the front fastener 38 defines a pivot axis about which the bracket may be swung, when the rear fastener 40 is removed, between a raised position, as illustrated, wherein the wheels 34 are elevated and the drag stake 36 is in a vertical working position, and a lowered position (not shown) wherein the wheels 34 are disposed for transporting the tiller and the drag stake is inclined downwardly and forwardly from rear to front with its front end elevated from the ground. An operator handle assembly 42 is secured to the tiller at the chain case 14 so as to provide means by which an operator may guide the tiller.

Figure 2:
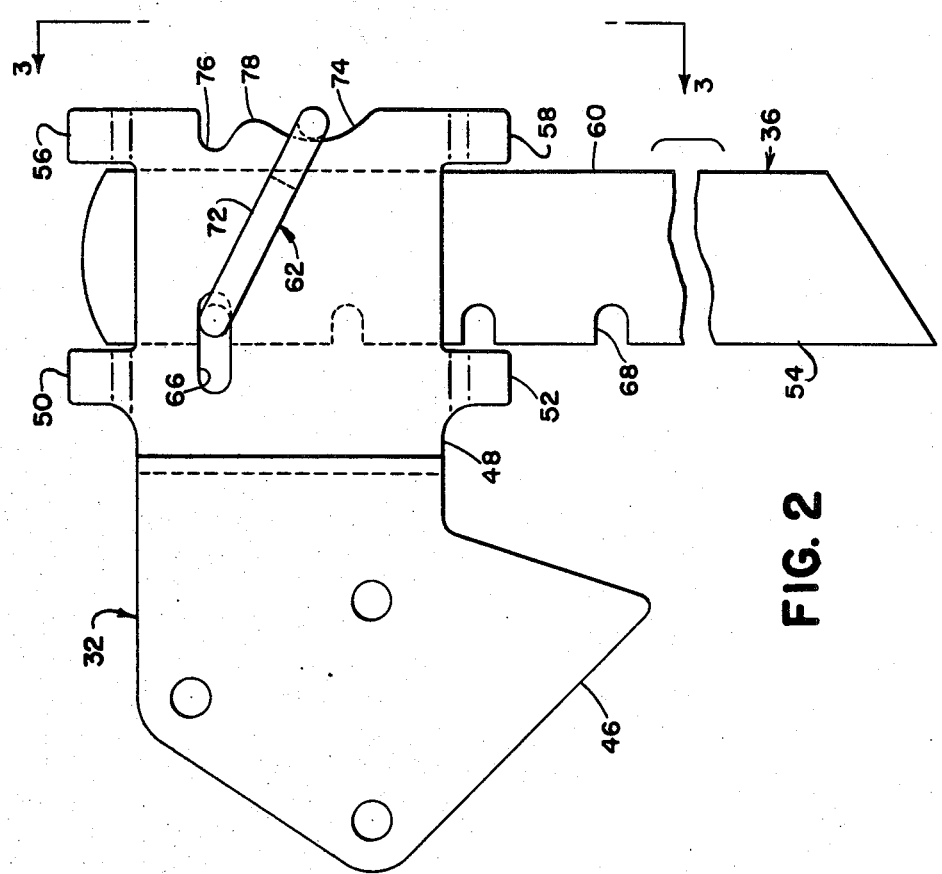
FIG. 2 is a left-side elevational view of the drag stake releasably secured to a bracket for securing it to a tiller frame.
Figure 3:
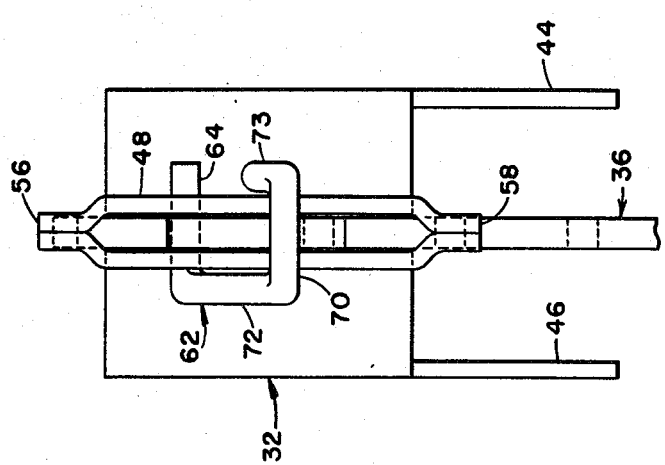
FIG. 3 is a rear elevational view taken along line 3—3 of FIG. 2.

Referring now to FIGS. 2 and 3, it can be seen that the bracket 32 is composed of right and left plates 44 and 46 and includes a rear portion 48 whereat the plates are spaced apart in close juxtaposition to the opposite sides of the drag stake 36. In order to guide the drag stake 36 vertically in and to prevent the latter from shifting fore-and-aft relative to the bracket 32, forward sets of upper and lower projections of the plates 44 and 46 are bent together and welded to form upper and lower vertically spaced guide tabs 50 and 52 located forwardly of but adjacent to a front edge or side 54 of the drag stake 36 and rearward sets of upper and lower projections of the plates 44 and 46 are bent together and welded to form upper and lower guide tabs 56 and 58 located rearwardly of but adjacent to a rear edge or side 60 of the drag stake 36. Thus, it will be appreciated that the bracket 32 defines a socket in which the drag stake 36 is slidably received.

So that the drag stake 36 may be vertically adjusted relative to the bracket 32 and retained in desired adjusted positions, there is provided a locking member 62 in the form of a ring segment including a first transverse section 64, at one end, which is received in a rear portion of a fore-and-aft elongated hole 66 in the bracket 32 and in a selected one of a plurality of vertically spaced notches 68 in the front edge 54 of the drag stake 36. The section 64 of the locking member 62 is prevented from accidentally shifting forwardly out of engagement with a selected one of the notches 68 by a second transverse section 70 joined to the first by a fore-and-aft section 72 and from accidentally shifting sideways out of engagement with one of the notches 68 by a fore-and-aft extending end section 73 paralleling the section 72 and disposed on the opposite side of the bracket 32 therefrom. The transverse section 70 engages a resting surface 74 formed in the rear edge of the bracket 32 at an elevation below that occupied by the elongate hole 66. To permit the locking member section 64 to be shifted forwardly in the hole 66 out of engagement with one of the notches 68 so as to free the stake 36 for vertical adjustment, the rear edge of the bracket 32 is also provided with a recess 76 located vertically above the resting surface 74 in fore-and-aft alignment with the hole 66 and separated from the surface by a retaining surface 78. The distance between the rearmost portions of the notch 68 engaged by the locking member 62 and the retaining surface 78 is preferably no less than the distance between the transverse locking member sections 64 and 70 but no greater than that through which the section 74 can be easily resiliently sprung apart whereby the drag stake may be released for vertical adjustment by first manually pivoting the lock member 62 upwardly about its section 64 to dispose the section 70 adjacent the recess 76 and then by shifting the member 62 forwardly to simultaneously move the section 70 into the recess 76 and the section 64 forwardly in the hole 66 and out of engagement with the previously selected notch 68 of the drag stake 36. Once the drag stake 36 is shifted vertically to bring another one of the notches 68 into register with the hole 66 it can again be locked in place by first shifting the lock member 62 rearwardly and then by pivoting it downwardly to move the section 70 past the retaining surface 78 to the resting surface 74. It is here noted that in many operating conditions, the action of gravity on the lock member 62 would keep the section 70 against the resting surface 74 such as to make the retaining surface 78 unnecessary but that the use of a retaining surface is preferred in order to lessen the probability of an accidental release of the drag stake.

While the drag stake 36 is here illustrated as being connected to the frame 12 by means of the bracket 32, it is to be understood that the drag stake could just as well be secured directly to the frame without departing from the invention.

The operation of the structure for mounting the drag stake 36 is thought to be clear from the foregoing description and for the sake of brevity no separate description of the operation is given.

I claim:

1. A drag stake mounting for a walk-behind rotary tiller comprising: a bracket defining a socket; a drag stake slidably received in the socket and including a leading surface in which is located a plurality of spaced notches; an elongate hole extending transversely through the bracket and including a rearward portion located to register with a selected one of said spaced notches and a forward portion located forwardly of the drag stake; said bracket further including a notch located rearwardly of the drag stake in general alignment with the elongate hole; a lock member having a first transverse section disposed in said hole and a second transverse section located behind the drag stake and spaced from the first transverse section such that when the lock member is in an unlock position wherein the second transverse section is located forwardly in the notch in the bracket the first transverse section will be disposed in the forward portion of the hole and free of the selected one of said spaced notches whereby the drag stake may be slid in the socket to bring a different one of the spaced notches into register with the elongate hole; said bracket further including a resting surface separated from the notch in the bracket by a retaining surface spaced from a rear surface of the one of said spaced notches a distance substantially equal to the distance between the first and second transverse sections of the lock member; said resting surface being spaced from the elongate opening such that when the lock member is in a lock position with the second transverse section engaging said resting surface the first transverse section will be located with the selected one of said spaced notches in the drag stake.

2. The drag stake mounting defined in claim 1 wherein said lock member is in the form of a ring segment including at least one section disposed alongside the bracket for preventing the first transverse section from accidentally shifting transversely out of the elongate hole.

3. The drag stake defined in claim 1 wherein the notch, retaining surface and resting surface of said bracket are located in a rear surface thereof.

4. The drag stake mounting defined in claim 2 wherein said first and second transverse sections of the lock members are straight and are joined by a first straight section extending perpendicular thereto; and a second straight section extending parallel to the first straight section and being joined to one of the first and second transverse sections on a side of the bracket remote from the first straight section.

* * * * *